United States Patent
Moon et al.

(10) Patent No.: US 11,907,314 B2
(45) Date of Patent: Feb. 20, 2024

(54) METHODS AND SYSTEMS FOR INTEGRATING DISPARATE DATA DOMAINS FEATURE DATA OVER COMPUTER NETWORKS

(71) Applicant: Snagajob.com, Inc., Glen Allen, VA (US)

(72) Inventors: John Moon, Glen Allen, VA (US); Keith Forshew, Glen Allen, VA (US); Ruhollah Farchtchi, Glen Allen, VA (US); Fabio Rosati, Glen Allen, VA (US)

(73) Assignee: Snagajob.com, Inc., Glen Allen, VA (US)

( * ) Notice: Subject to any disclaimer, the term of this patent is extended or adjusted under 35 U.S.C. 154(b) by 182 days.

(21) Appl. No.: 17/480,305

(22) Filed: Sep. 21, 2021

(65) Prior Publication Data
US 2022/0350850 A1     Nov. 3, 2022

Related U.S. Application Data

(60) Provisional application No. 63/183,362, filed on May 3, 2021.

(51) Int. Cl.
| | | |
|---|---|---|
| G06F 16/9535 | (2019.01) | |
| G06F 16/25 | (2019.01) | |
| G06F 3/0482 | (2013.01) | |
| G06F 16/23 | (2019.01) | |
| G06F 16/215 | (2019.01) | |
| G06F 16/9538 | (2019.01) | |
| G06F 16/178 | (2019.01) | |
| G06F 16/9536 | (2019.01) | |

(52) U.S. Cl.
CPC ........ *G06F 16/9535* (2019.01); *G06F 3/0482* (2013.01); *G06F 16/1794* (2019.01); *G06F 16/215* (2019.01); *G06F 16/2365* (2019.01); *G06F 16/258* (2019.01); *G06F 16/9536* (2019.01); *G06F 16/9538* (2019.01)

(58) Field of Classification Search
CPC .. G06F 16/9535; G06F 16/215; G06F 16/258; G06F 16/2365; G06F 3/0482; G06F 16/9538; G06F 16/9536; G06F 16/1794
See application file for complete search history.

(56) References Cited

U.S. PATENT DOCUMENTS

| | | | | |
|---|---|---|---|---|
| 2009/0254971 | A1* | 10/2009 | Herz | G06Q 30/0603 726/1 |
| 2011/0276507 | A1* | 11/2011 | O'Malley | G06Q 10/00 705/321 |
| 2018/0025309 | A1* | 1/2018 | Absher | G06Q 10/063112 705/7.14 |
| 2020/0364232 | A1* | 11/2020 | Wakankar | G06F 16/9535 |

* cited by examiner

*Primary Examiner* — Kris E Mackes
*Assistant Examiner* — Lin Lin M Htay
(74) *Attorney, Agent, or Firm* — Perkins Coie LLP

(57) ABSTRACT

Methods and systems for generating an integrated structure for the data from disparate data domains that may be used to aggregate, compare, and/or provide recommendations based on the data available from the disparate domains. The integrated structure may further be accessible to users to perform functions (e.g., searches, filtering operations, etc.) in real-time and receive outputs (e.g., in a user interface).

18 Claims, 8 Drawing Sheets

FIG. 1A snagajob | Find urgently hiring jobs | Location ⊙ | 20 miles ▾ | Search | Job Seekers | Employers | Post my job | Sign In (All) (My Matches) (Urgently Hiring) (1-Click) (Essential Jobs) (Industry ▾) (Part-time) (Full-time) (Teen)

1491253 Jobs    Relevency

FEATURED

Amazon is Hiring! ← 102
Check out these jobs near you

Restaurant Manager ☆ ☆ ♡
Wendy's
Davenport, FL 33897
⊙ Full-time

Certified Med-Tech ☆ ♡
Benton House
Olathe, KS 66062
⊙ Full-time, Part-time

URGENTLY HIRING

Doughnut Maker - Cook ☆ ♡
Krispy Kreme
Concord, NC 28027
⊙ Full-time

---

Restaurant Manager                                    ♡ ⊠ (Apply Now) ← 106
Wendy's                                                    ☆ ☆ ☆
Davenport, FL 33897                                        You're a top match!
Full-time
Starting at $10.00
Refer friends, get paid!
🚌 🚶 View commute time

Job Description

If you are looking for a Company that provides a respectful environment and plenty of opportunity for development and growth opportunity, then consider the following:

↑ 104

JAE Restaurat Group owns and operates 213 limited service restaurants in Florida, New mexico, Tennesee and Texas.
Our mission is to be CUT ABOVE to our stakeholders while remaining ture...

METHODS AND SYSTEMS FOR INTEGRATING DISPARATE DATA DOMAINS FEATURE DATA OVER COMPUTER NETWORKS

This application claims the benefit of priority of U.S. Provisional Patent Application No. 63/183,362, filed May 3, 2021, the content of which is incorporated herein in its entirety by reference.

BACKGROUND

Integrating data from multiple sources creates numerous technical challenges. As an initial issue, different sources of data, and a location of specific data within those sources, must first be located. Even after the location of data has been identified, the data from multiple sources must be migrated and unified. This process creates additional issues to resolve duplication, inconsistencies, and inaccuracies in the unified data. To attempt to address these issues, data profiling may be used where data from different sources is compared. However, in many cases, a value (e.g., corresponding to the name and address of an entity) may be recorded in numerous different formats. Each format may be specific to a source and there may be little standardization between sources. Furthermore, even if data is recorded in the same (or a comparable format), the context of that data may by different between sources. For example, one data source may express a concept (e.g., a characteristic of the data) in a different manner (e.g., using different values, metrics, units of measures, etc.) than another data source. Conventional data profiling techniques fail to account for this issue. This technical problem increases exponentially when concepts are expressed in qualitative expressions and/or a mixture of qualitative and quantitative expressions.

SUMMARY

Methods and systems are described herein for integrating disparate data domains over computer networks. In particular, methods and systems are described herein for integrating data from numerous sources that may comprise data in non-standardized formats and using non-homogenous ontologies for categorization of that data. More particularly, methods and systems are described for generating an integrated structure for the data from disparate data domains that may be used to aggregate, compare, and/or provide recommendations based on the data available from the disparate domains. The integrated structure may further be accessible to users to perform functions (e.g., searches, filtering operations, etc.) in real-time and receive outputs (e.g., in a user interface).

To overcome the limitations of the conventional systems, as described above, the system generates an integrated structure. The integrated structure includes structure nodes. Each structure node may comprise data definitions that translate ontologies of data definitions for non-integrated data management systems (e.g., ontologies developed by, and native to, individual domains). More specifically, each structure node may comprise an integrated data definition, of an integrated ontology of data definitions for the integrated structure, that indicates a non-binary correlation between a first data definition for a first ontology of data definitions (e.g., for a first domain) and a second data definition for the second ontology of data definitions (e.g., for a second domain).

For example, as described above, conventional data profiling technique are ill suited for data from disparate domains, especially when data values may have domain specific contexts. In such cases, conventional data profiling, which relies on binary cross-referencing (e.g., defining data and/or a value of data from one domain as equaling data and/or a value of data from other domain) are unable to detect nuances is contexts of the data. Accordingly, the integrated structure indicates a non-binary correlation (e.g., a probability or strength of correlation) between a first data definition for a first ontology of data definitions (e.g., for a first domain) and a second data definition for the second ontology of data definitions (e.g., for a second domain).

Furthermore, to ensure that the integrated structure may be accessible to users to perform functions (e.g., searches, filtering operations, etc.) in real-time and receive outputs (e.g., in a user interface), the system generates for display, on the user interface, native data, for the first or second edge structure, based on non-binary correlation. For example, the system may generate values for the first or second edge structure based on the non-binary correlation indicating that the first data definition (e.g., for the first edge structure) for the first ontology of data definitions and a second data definition (e.g., for the second edge structure) for the second ontology of data definitions correspond. Moreover, to ensure that users performing functions using the integrated structure understand the context of the native data, the system generates for display (e.g., simultaneously with the native data) relationship data, wherein the relationship data describes, in a human-readable format, a relationship of the native data to the integrated ontology of data definitions.

For example, when applying the integrated structure to one practical application (e.g., employment listings), the system may create interconnections among seemingly disconnected elements (e.g., words with different contexts) and events (e.g., potential employment opportunities) and give an opportunity for real-time earning ability for workers where they can begin working for a company that they may never have heard of within minutes of being matched to that job or shift. Interactive tools, career pathing, behavioral data, geographic, and other data built upon the interconnections also allows for these workers (and employers) to gain insight into jobs or shifts that best meet their needs.

In one aspect, systems and methods are described for integrating disparate data domains over computer networks. For example, the system may receive a user request to access an integrated structure for an integrated data management system, wherein the integrated structure is defined by an integrated ontology of data definitions for the integrated data management system. The system may retrieve a first edge structure for a first non-integrated data management system, wherein the first edge structure is defined by a first ontology of data definitions for the first non-integrated data management system. The system may retrieve a second edge structure for a second non-integrated data management system, wherein the second edge structure is defined by a second ontology of data definitions for the second non-integrated data management system. The system may generate the integrated structure based on the first edge structure and the second edge structure, wherein the integrated structure includes a structure node with an integrated data definition, of the integrated ontology of data definitions, indicating a non-binary correlation between a first data definition for the first ontology of data definitions and a second data definition for the second ontology of data definitions. The system may receive a user selection corresponding to the structure node. The system may, in response to the user selection corresponding to the structure node, generate for display native data for the first edge structure or the second edge structure, and relationship data, wherein the relationship data describes, in a human-readable format, a relationship of the native data to the integrated ontology of data definitions.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 1A shows an illustrative user interface for an integrated data management system, in accordance with one or more embodiments.

FIG. 3 shows another illustrative user interface for an integrated data management system, in accordance with one or more embodiments.

DETAILED DESCRIPTION OF THE DRAWINGS

Figure 1B:
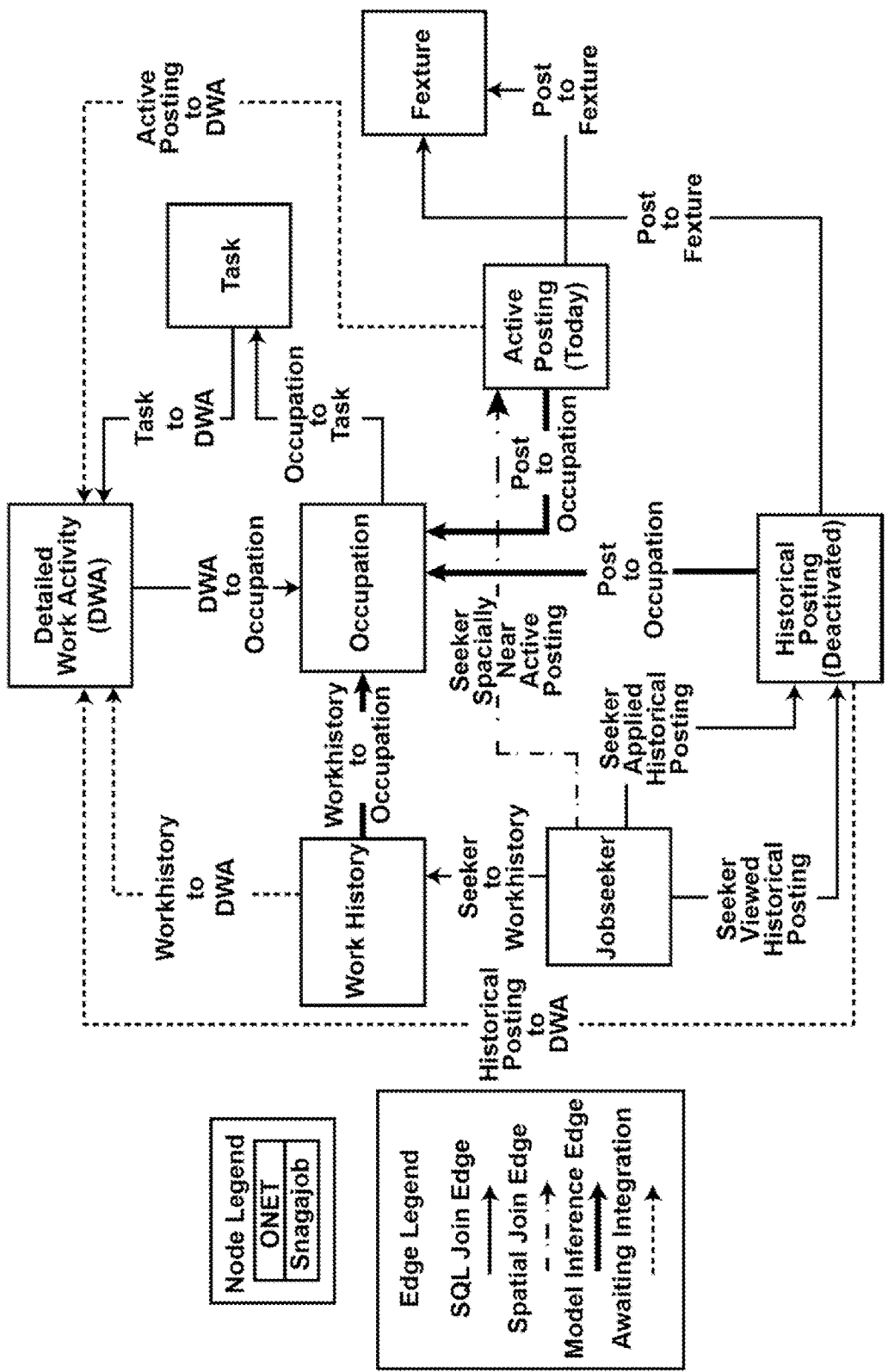
FIG. 1B shows an illustrative system diagram for an integrated data management system, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

FIG. 1A shows an illustrative user interface for an integrated data management system, in accordance with one or more embodiments. For example, the systems and methods described herein may generate for display, on a local display device (e.g., user device 422 and 424 (FIG. 4) described below), a user interface for an integrated data management system. As shown in FIG. 1, in some embodiments, the integrated data management system may generate recommendations based on data from disparate computer systems (e.g., different entities, data sources, and/or domains). As shown in FIG. 1, in some embodiments, the recommendations may be for employment opportunities at various employers.

For example, the system may create interconnections among seemingly disconnected elements and events such as job titles, characteristics, etc. The system may use these interconnections to provide interactive tools related to employment opportunities such as career pathing, behavioral data, geographic, and other data that gives the worker insight into jobs or shifts that best meet their needs and/or applicants that best fit the needs of the employer. In one particular example, the system may provide a recommendation (e.g., display native data) based on real-time earning ability for workers, where they can begin working, and what opportunities are matched to them. Notably, the recommendation may recommend not only available positions, but also individual shifts available.

User interface 100 may comprise a user interface for an integrated data management system. An integrated data management system may include an employment management system that integrates multiple other systems (e.g., other non-integrated data management system for an employer). Through user interface 100, the integrated data management system, may receive a user request to access an integrated structure (e.g., as shown in user interface 100 (FIG. 1)) and/or perform one or more operations (e.g., select available employment opportunities such as posting 102, apply for a position by selecting icon 106, or receive information about an opportunity by reading native data 104). For example, the user interface may present native data such as a description of an employment opportunity as shown in FIG. 1.

As referred to herein, a "user interface" may comprise a human-computer interaction and communication via a device, and may include the use of display screens, keyboards, a mouse, and the appearance of a desktop or mobile device. For example, a user interface may comprise a way a user interacts with an application or a website. As referred to herein, "content" should be understood to mean an electronically consumable user asset, such as Internet content (e.g., streaming content, postings, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms.

Figure 3:
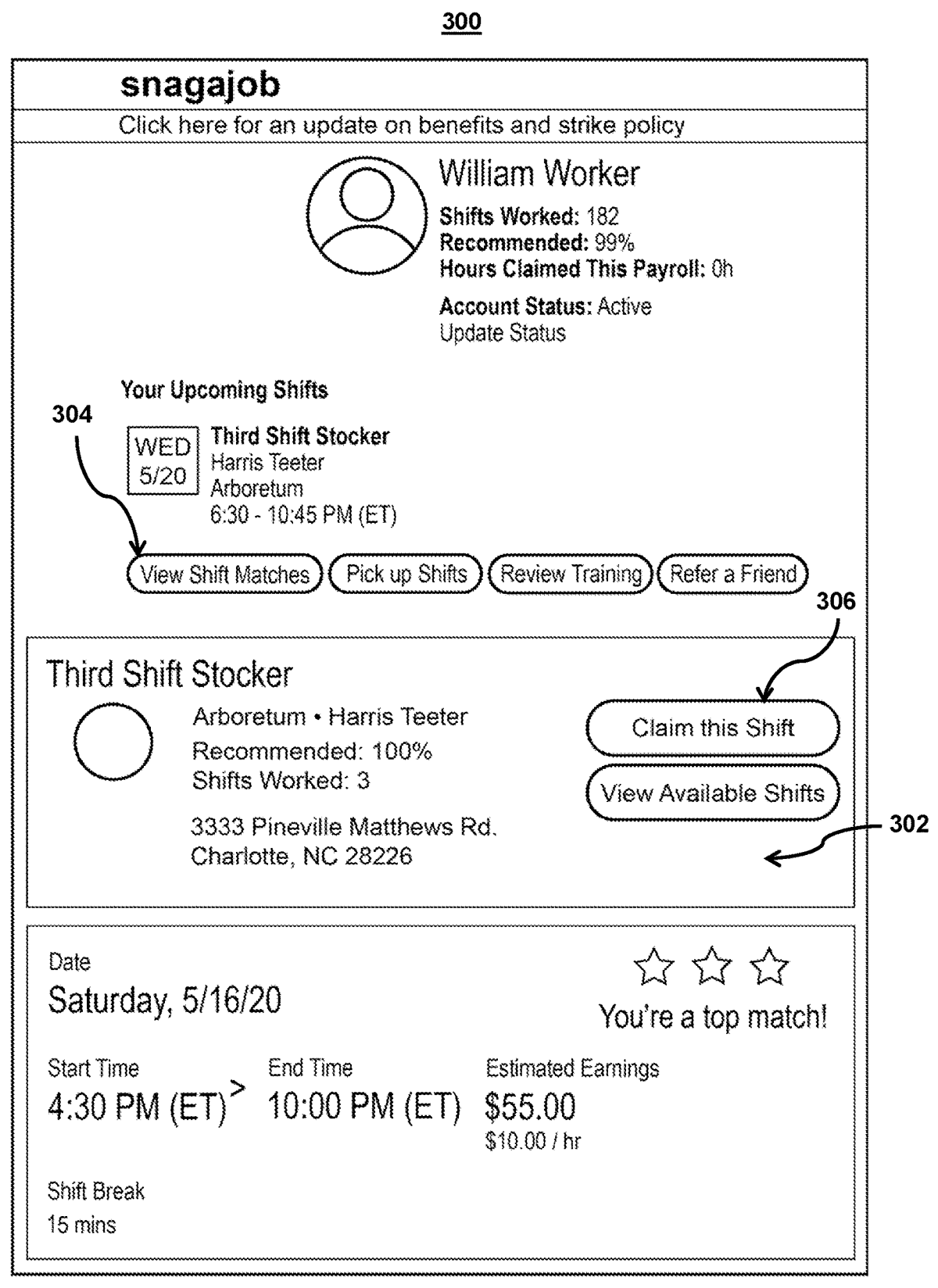

As one non-limiting example, through user interface 100 (and its underlying integrated data management system), the system may be used to link hourly workers to hourly jobs for which they are the best fit. The system may generate recommendations (e.g., as shown in FIG. 3), including jobs users may not understand they are suitable for through an understanding of the work activities making up hourly jobs. For example, native data (e.g., a job title, work requirements, etc.) provided by an employer (e.g., corresponding to a non-integrated data management system) may use words that have a context that is unknown to the user (e.g., the employer may call a "salesperson" a "deal finder"). The system may interpret this data using an integrated structure, generate a recommendation that include native data (e.g., data supplied by the employer) and relationship data (e.g., data generated by the system to describe the context of the native data). The system may generate these recommendations by mapping data to the skills that users have exhibited in their work experience, and/or the behaviors they exhibit using the system's website.

For example, the system may assist workers in connecting with hiring managers and companies based on a common set of skills, qualifications, availability, search behavior, job requirements, and financial considerations. The system may also assist employers in connecting with workers based on a common set of skills, qualifications, availability, search behavior, and job requirements.

For example, previously, job-seekers would spend countless hours they did not have to spare applying for work. They did this without being able to know if the hours would fit their schedule, if they would earn the hourly rate they are looking for, or if they would have job security. These issues may cause users to feel skeptical of the hiring process as they did not know if they were applying to real opportunities, if the hiring manager is non-discriminator, if market friction may cause many downstream problems, etc. Conventional systems lack transparency and some workers struggled with reliable transportation or childcare, causing them to miss out on earnings and lose credibility with their managers. Through the use of this system, these problems may be alleviated as each part of the system enhances the other parts in ways that were not possible previously. For example, a worker who has completed 10 shifts at 10 different businesses provides a wealth of data that could not be gained by having one or two jobs per year.

For example, the system may generate recommendation are personalized for a user based on user inputs and/or user preferences (e.g., as stored in a user profile). A user profile may be a directory of stored user settings, preferences, and information for the related user. For example, a user profile may have the settings for the user's installed programs and operating system. In some embodiments, the user profile may be a visual display of personal data associated with a specific user. In some embodiments, the user profile may be digital representation of a person's identity. The data in the user profile may be generated based on the system actively or passively monitoring.

The user profile may include information such as a Worker Work History Classification ("WWHC"), which uses a multi-classification model to classify a worker's work history (e.g., a job they completed) against an Hourly Work Cognizance Graph ("HWCG") resulting in a Worker Detailed Work Activity Score ("WDWAS"), which is a numerical representation of the sum of the worker's experience with each detailed work activity derived from the WWHC.

The system may also use an engagement engine to build a user profile. For example, the system may be an interactive system that helps the candidate to locate into the best roles for them. The system may ask questions and collect preference through tools based on prior intelligence and likely interest based on prior experience of other marketplace members. The system may build on a collection of predictive models (e.g., as described in FIG. 4) using proprietary parameters that are weighted based on their predictive nature of the data (e.g., using hyper parameters).

User interface 100 may generate for display data related to an integrated data management system. For example, the system may store native data corresponding to fields of first non-integrated data management systems (or other non-integrated systems) and relationship data (e.g., relationship data 202 (FIG. 2)). For example, relationship data may describe a relationship of the native data to the integrated data management system, at a structure node in the architecture of the integrated data management system. The structure node may correspond to the convergence of two structures in the architecture of the integrated data management system. Each structure may itself correspond to a native hierarchal relationship in a second non-integrated data management system. For example, one data source (e.g., a first employer) may describe employment opportunities using terms (e.g., "sandwich artist") while another data source (e.g., a second employer) may describe the employment opportunities using different terms (e.g., "team member").

In some embodiments, user interface 100 (or the relationship data therein) may be presented as a status page. The status page may include summary information about an employer, posting, responsible team members, etc. The status page may also include queries that may be performed (e.g., queries based on progress, benefits, requirements, etc.). User interface 100 may also include a chart indicating progress in an employment application and/or characteristics for employment opportunities using one or more data definitions and/or sub-data definitions.

Native data may comprise proprietary or third party data or proprietary or third party data-formats comprise data that originates from and/or relates to the first non-integrated data management system, the second non-integrated data management systems, and/or their respective plugins. In some embodiments, native data may include data resulting from native code, which is code written specifically for the first non-integrated data management system, the second non-integrated data management systems, a respective plugin designed therefor.

For example, native data may comprise information about an employer name, job title, benefits, required experience, responsibilities and/or geographic data. This native data may be organized into an ontology of data definitions for a non-integrated data management system. Each non-integrated data management system may have its own ontology of data definitions. The system may generate an integrated ontology of data definitions for the integrated data management system to allow the system to integrate the disparate ontologies and/or data definitions.

The system may also present relationship data. Relationship may include data that describes, in a human-readable format, a relationship of the native data to the integrated ontology of data definitions. For example, relationship data may describe the relationship between one ontology and another. For example, relationship data may indicate that a job title (e.g., "team member") corresponds to a standardized job title (e.g., "short order cook") and/or a skill set of the user. The relationship data may be presented in any format and/or representation of data that can be naturally read by humans. In some embodiments, the relationship data may appear as a graphical representation of data. Additionally or alternatively, the relationship data may comprise a normalization of native data into predetermined categories and/or alternative verbiage. The relationship data may be based on deep content and interactivity with a mix of public and private information is used to give the worker a feel and sense of working in the job and the broader industry.

For example, the system may use language and content analysis to augment an hourly job posting with additional machine readable contextual data. In some embodiments, the data definitions may relate to a normalized brand name (e.g., an employer name), a normalized job title (e.g., based on a textual context model that reduces narrative job titles into a root title), a normalized industry (e.g., a collection of common board categories and a collection of specific categories that give the context for the working environment, a normalized geographic area (e.g., a metropolitan statistical area for each job posting), an estimated wage (e.g., using text analysis of the posting content to estimate the wage of the job, benefits (e.g., using machine-usable attributes that indicate the benefits to the worker for a job), required experience such as qualifications based on machine-usable attributes that indicate the qualifications required for the job and responsibilities using machine-usable attributes that encompass the responsibilities that will be required of the worker in the job, and/or geographic data (e.g., using the specific location where the job).

FIG. 1B shows an illustrative system diagram for an integrated data management system, in accordance with one or more embodiments. The integrated data management system may include an integrated structure. The integrated structure (e.g., integrated structure 150) may be defined by an integrated ontology of data definitions (e.g., data definitions 152) for the integrated data management system. For example, integrated structure 150 may comprise a plurality of types of data structures or data models. On such data structure is a hierarchical data structure. A hierarchical database structure may comprise a data model in which the data is organized into a tree-like structure. The data may be stored as records which are connected to one another through links. A record is a collection of fields, with each field containing only one value. The type of a record is defined by which fields the record contains. For example, in the hierarchical database structure each child record has only one parent, whereas each parent record can have one or more child records.

The integrated structure may comprise, be based on or correlated to, a cognizance graph such as the HWCG. As referred to herein, a cognizance graph may include a knowledge base that uses a graph-structured data model or topology to integrate data. Knowledge graphs are often used to store interlinked descriptions of entities—objects, events, situations or abstract concepts—with free-form semantics. For example, the cognizance graph may (i) define abstract classes and relations of entities in a schema, (ii) mainly describe real world entities and their interrelations, organized in a graph, (iii) allow for potentially interrelating arbitrary entities with each other, and (iv) cover various topical domains.

For example, as shown in FIG. 1B, diagram 130 displays a representation of cognizance graph and the edge data structures used to support the cognizance graph. For example, the cognizance graph may formally represent semantics by describing entities (e.g., employment opportunities) and their relationships (e.g., characteristics and/or opportunities that correlate to each other). Cognizance graphs may make use of ontologies as a schema layer. For example, diagram 130 may represent an integrated ontology of data definitions for the integrated data management system. By doing this, they allow logical inference for retrieving implicit knowledge (e.g., employment opportunities and/or characteristics about employment opportunities that while described differently using native data of a source are correlated) rather than only allowing queries requesting explicit knowledge (e.g., searching using matches to native data).

In order to allow the use of cognizance graphs in various machine learning tasks, and the cognizance graph embeds the connections through the use of the integrated structure to provide a non-binary correlation between different ontologies. As referred to herein, a non-binary correlation includes any estimate of conceptual similarity (e.g., between a first data definition for the first ontology of data definitions and a second data definition for the second ontology of data definitions). The non-binary correlation may be expressed in a score, ranking, probability, and/or another metric. The correlation may be based on similarities between employment opportunities and/or characteristics about employment opportunities and/or other factors.

For example, in an employment example, a correlation may be represented by a numerical score that represents the degree of suitability of a particular worker to a particular job posting. The system may calculate the score based on one or more factors such as: a degree of match between the job posting classification and underlying detailed work activities to a WDWAS; a degree of match between the job posting classification and underlying detailed work activities to a worker activity recency score; a degree of match between the job posting classification and underlying detailed work activities to a worker brand experience score; a degree of match between the job posting classification and underlying detailed work activities to a worker behavior score such as interview show rate, and search behavior showing interest in similar job classifications. The system may also use geographic information such as the commute distance between the worker's residence and their desired place of employment, and the system may also use polygon pathing to understand super-micro areas where there are employment and residential densities as most people want to work in an area that is in a non-uniform shape such as along a bus route or major roadway.

In some embodiments, to determine a correlation, the system may use edge-based and/or node-based approaches. For example, edge-based approaches use the edges and their types as the data source, while node-based approaches use the nodes and their properties. Each record may act as a node. In some cases, the node may be a structure node. For example, the structure node may be a basic unit of a data structure, such as a linked between one or more structures. Each structure node may contain data and also may link to other nodes. For example, the integrated structure may be represented by a non-linear data structure of nodes and edges (e.g., a cognizance graph). In some embodiments, the system may implement links between nodes through pointers. Additionally, a structure node may be a node shared by one or more structures (e.g., a point of integration of a first edge structure and a second edge structure).

For example, a section characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, the system may receive data definitions (e.g., metadata describing the characteristic of an ontology, data source, and/or employment opportunity, wherein the metadata indicates a context of the content characteristic, and wherein the content characteristic comprises human-readable text). For example, as shown in integrated structure 150, the system may identify data definitions 152. As referred to herein, a "data definitions" may comprise any of the more or less distinct parts into which something the ontology, data source, and/or employment opportunity may be divided or from which the ontology, data source, and/or employment opportunity is made up. For example, a data definition may be anything that may distinguish one characteristic from another. In some embodiments, ontology, data source, and/or employment opportunity may be human-readable text. For example, the ontology, data source, and/or employment opportunity may be a keyword, an image, an embedded object, etc.

For example, integrated structure 150 may comprise first edge structure 154 and second edge structure 156. In some embodiments, the first data structure may comprise a data organization, management, and storage format that enables efficient access and modification for a second non-integrated data management system. For example, the first data structure may include a collection of data values, data fields, the relationships among them, and the functions or operations that can be applied to the data. The first edge structure may define a first ontology of data definitions for the second non-integrated data management system.

For example, the cognizance graph representation of the relationships between hourly jobs and the detailed work activities and other data that constitute those jobs may be used to create analytics (e.g., the integrated structure) are built using determined relationships (e.g., correlations). The system therefore allows for an understanding of the inter-relationship between jobs. The analytics are computations performed on the cognizance graph that can be used in downstream tasks such as recommendation and matching. At root, an analytic is a function that takes a collection of entities from the graph, and possibly other analytics and data sources, and returns a collection of results (e.g., a non-binary correlation), which may be keyed on a primary key of some entity in the graph (e.g. job fit score is keyed on the seeker and job posting primary keys and stores).

The system may use a floating point value for each such pair indicating the degree of fit between the seeker and the posting (e.g., a non-binary correlation). The system may use edge data structures (e.g., representing an ontology of data definitions) as the analytics may be generate in various ways, including at present API endpoints. Using the analytics as shown in the FIGS. 1B-C, below there is a substantially higher accuracy in the connection of workers intent and the workers actions. For example, for a worker is interested in a "cashier job" (see e.g., FIG. 2), the action shows that they want to work as a cashier in a business such as a casino or check cashing company verse a cashier at a convenience store.

In some embodiments, the second data structure may comprise a data organization, management, and storage format that enables efficient access and modification for the first non-integrated data management system. For example, the second data structure may include a collection of data values, data fields, the relationships among them, and the functions or operations that can be applied to the data. The second edge structure may define a second ontology of data definitions for the first non-integrated data management system.

Figure 1C:
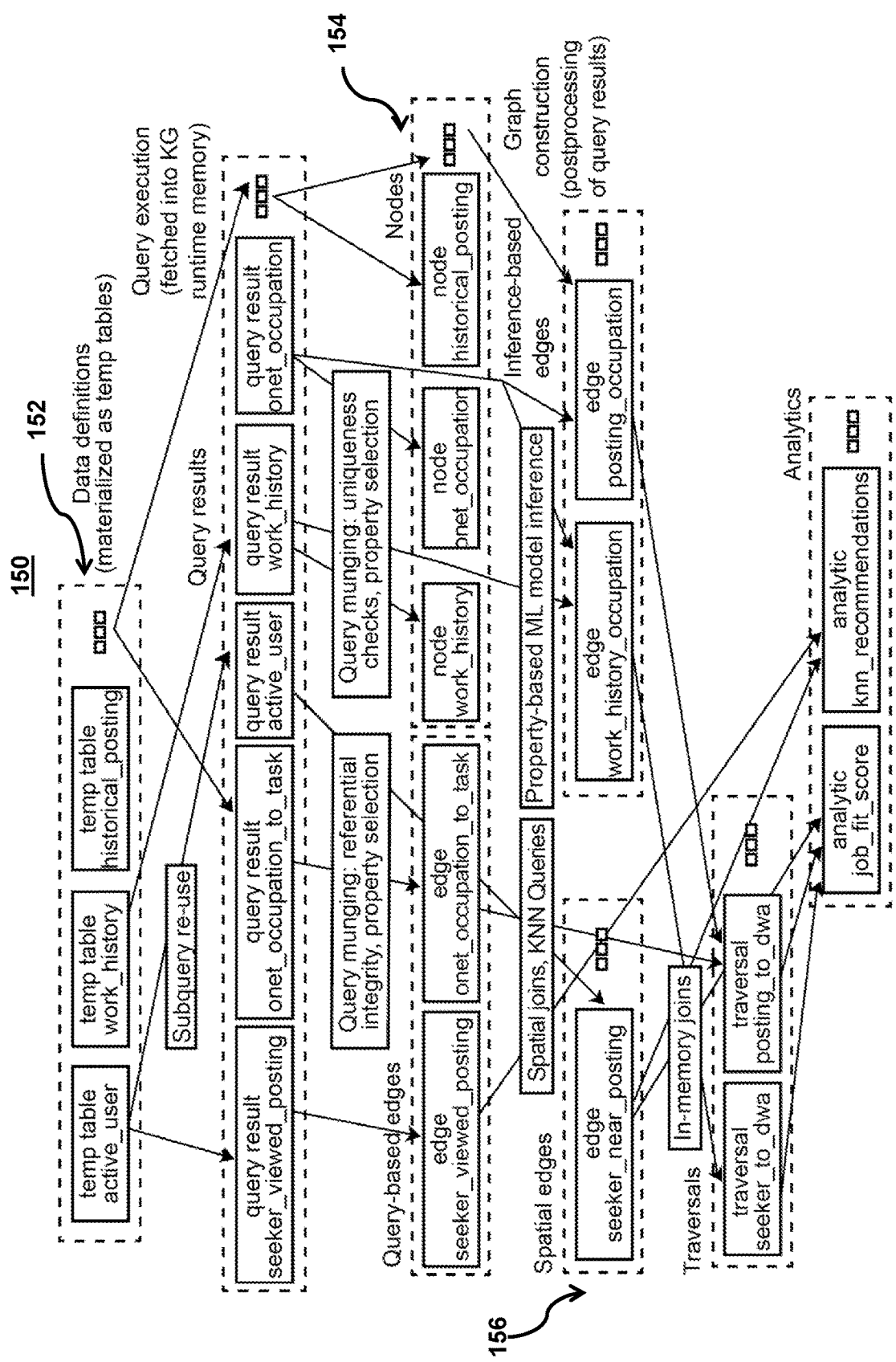
FIG. 1C shows an illustrative system diagram for a cognizance graph used for an integrated data management system, in accordance with one or more embodiments.

As shown in integrated structure 150, first edge structure 154 and second edge structure 156 may share a node (e.g., a structure node may exist). For example, integrated structure 150, as shown in FIG. 1C, may reflect a cognizance graph of integrated structure 150. It should also be noted that in some embodiments, the system may build integrated structure 150 based on a consolidated graph from multiple structures (e.g., first edge structure 154 and second edge structure 156). That is, the cognizance graph may be split across multiple structures and then consolidated and joined.

Figure 2:
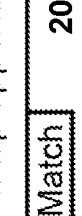
FIG. 2 shows another illustrative user interface for an integrated data management system, in accordance with one or more embodiments.

FIG. 2 shows another illustrative user interface for an integrated data management system, in accordance with one or more embodiments. For example, the system and methods described herein may generate for display, on a local display device (e.g., user device 422 and 424 (FIG. 4) described below), a user interface for an integrated data management system. For example, FIG. 2 displays user interface 200. User interface 200 may represent an exemplary user interface for an integrated data management system. As such, user interface 200 may include a plurality of data definitions (e.g., data definition 204) that relate to an ontology. In some embodiments, the ontology may relate to an employment opportunity.

As described herein, an employment opportunity may include any individual or collaborative enterprise that is planned and designed to achieve a particular aim. As presented in FIG. 2, the plurality of employment opportunities and/or data definitions related thereto may be filtered based on a user selection requesting the display of data related to employment opportunities matching skills of the user. For example, a user may filter the employment opportunities by selecting an icon.

As shown in FIG. 2, the system may use an Hourly Position Classifier to select employment opportunities. For example, the system may use a multi-classification model to classify hourly job postings against the HWCG. To do so, the system may use the content of a job description, the employer, the job title, and other date elements assign a durable position label. The system may a durable entity as a common language across brands, geographies, and industries to assess performance, micro, and macroeconomics, and other uses.

FIG. 3 shows another illustrative user interface for an integrated data management system, in accordance with one or more embodiments. The system may create an Hourly Job/Shift Match Score as shown in FIG. 3. For example, the system and methods described herein may generate for display, on a local display device (e.g., user device 422 and 424 (FIG. 4) described below), a user interface for an integrated data management system. User interface 300 may comprise a user interface for an integrated data management system. Through user interface 300, the integrated data management system, may receive a user request to access an integrated data (e.g., as shown in user interface 100 (FIG. 1) above) and/or perform one or more operations (e.g., as shown in user interface 200 (FIG. 2) above) such as generating a recommendation (e.g., recommendation 302), perform further searches (e.g., via option 304), and/or select available employment opportunities (e.g., via option 306).

For example, the system may use a score system, based on data and intelligence, calculated from sets of job posting and employer data, worker data, as well as user preferences, and search performance data like popularity, geo location, and hiring budgets. This data set powers the system for hourly work that has previously been leveraged only in salaried spaces. The rating system reduces the stress of the hiring process and passes time benefits to both employers and workers. The numerical score that represents the degree of suitability of a particular job for a particular worker (e.g., correlation between a user's profile and an employment opportunity).

The system may provide jobs, shifts and future opportunities to workers without them needing to search and review lists or traverse a map to find opportunities they are most suited for. This does not prevent candidates from seeing all jobs available to them in their locality or they are interested in learning more about and applying to. For example, due to the diverse nature of work shifts may be completed by a worker at many businesses, the matching process may use a much higher fidelity of diverse data to determine the suitability of future work. This resolution of data is only possible due to the interconnection of workers completing shifts from a large swath of companies and jobs, each having their own list of requirements, skills, and daily work activities.

The system may determine an Hourly Job/Shift Match Score based on factors such as: degree of match between the job posting classification and underlying detailed work activities, to the WDWAS; location of the job related to the worker; worker search behavior showing interest in similar job classifications; wage as related to the worker's wage requirement; and/or an employer reputation score calculated from both worker reviews and employer behavior such as speed to respond to applications.

The system may also use an Hourly Job/Shifts Recommender, which uses a combination of data elements show jobs that are most suited for a person. The system may consider the wage needs for the worker and the rate the business is willing to pay, the commute distance, the polygon pathing between the worker and the business, and/or the ability to recommend a shift at a different business immediately upon completing a shift, which allows the worker to continue to grow in their career though learning new skills while meeting their financial obligations.

For example, the system may use a worker profile recommender to present opportunities as shown in user interface 300. The worker profile recommender may use data and a combination of data elements to show workers that are most suited for employers or hiring managers. Using the data provided and/or a mix of algorithms to ensure the best fit jobs are brought to the worker early in the engagement while refining their current interest and their needs. The recommendations may respond to the short-term needs due to change in schedule, life events, and demands of other employment the worker may be engaged in. Furthermore, the recommendation may be built on a real-time graph database (e.g., the integrated data structure) using a series of nodes and edges that allows traversal of seemingly disconnected data features that are in-fact connected. For example, engagement data is available to the recommendations in near real-term and allows for very response recommendations based on the new information as it becomes available.

Additionally, the system may provide career pathing. For example, the system may allow workers to understand which skills and abilities are necessary to move forward to a job or career that meets their financial needs and the work availability needs. The system may generate relationship data based on deep content and interactivity with a mix of public and private information is used to give the worker a feel and sense of working in the job and the broader industry.

Figure 4:
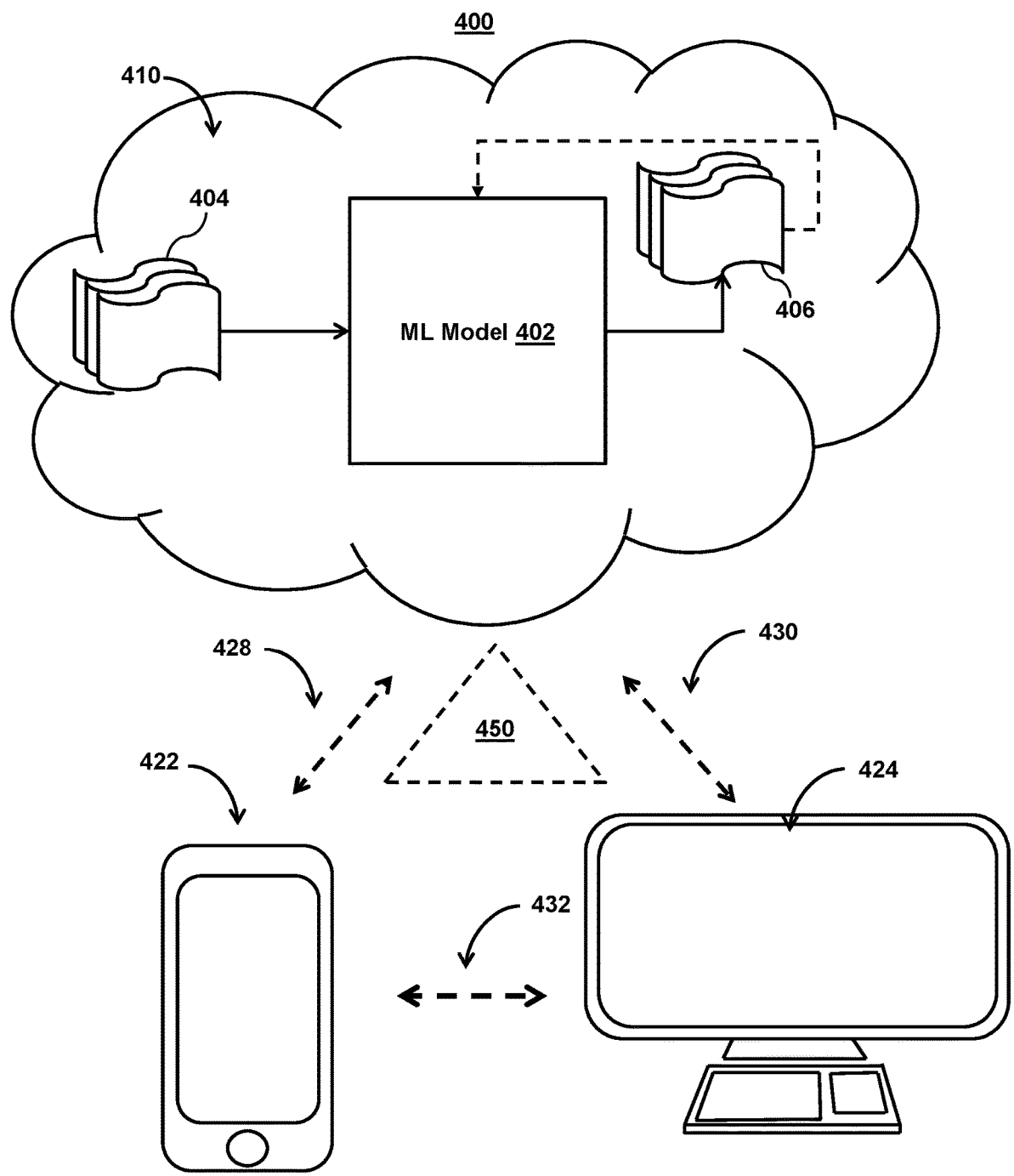
FIG. 4 shows illustrative system components for integrating disparate data domains over computer networks, in accordance with one or more embodiments.

FIG. 4 shows an illustrative system for integrating disparate data domains over computer networks, in accordance with one or more embodiments. As shown in FIG. 4, system 400 may include user device 422, user device 424, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes machine learning model 402, which may be implemented on user device 422 and user device 424, or accessible by communication paths 428 and 430, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, one or more of the components of system 400 may include cloud-based components (e.g., cloud-based memory, cloud-based control circuitry, cloud-based I/O circuitry, etc.). For example, cloud-based memory may be configured to: store a first edge structure for a first non-integrated data management system, wherein the first edge structure is defined by a first ontology of data definitions for the first non-integrated data management system; and store a second edge structure for a second non-integrated data management system, wherein the second edge structure is defined by a second ontology of data definitions for the second non-integrated data management system. Cloud-based control circuitry may be configured to: receive a user request to access an integrated structure for an integrated data management system, wherein the integrated structure is defined by an integrated ontology of data definitions for the integrated data management system; and receive a user selection corresponding to the structure node. Cloud-based I/O circuitry may be configured to generate for display, on a local display device, native data, based on the non-binary correlation, for the first edge structure or the second edge structure, and relationship data, wherein the relationship data describes, in a human-readable format, a relationship of the native data to the integrated ontology of data definitions.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications network or combinations of communications networks. Communication paths 428, 430, and 432 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 4, machine learning model 402 may take inputs 404 and provide outputs 406. The inputs may include multiple data sets such as a training data set and a test data set. Each of the plurality of data sets (e.g., inputs 404) may include data subsets with common characteristics. The common characteristics may include characteristics about a data source (e.g., employer and/or employment opportunity), a structure, a structure node, a data definition and/or domain for use in integrating data management systems. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions. These predictions may correspond to determining non-binary correlations between first data definitions, populating structure nodes in an integrated data structure, and/or providing recommendations to a user.

For example, in some embodiments, machine learning model 402 may be trained to generate an integrated structure. For example, machine learning model 402 may be trained to determine a first system type for the first non-integrated data management system and/or a second system type for the second non-integrated data management system. In another example, machine learning model 402 may be trained to determine a rule set for automatically generating the integrated structure based on the first system type and the second system type and/or generate an integrated structure based on the rule set, wherein the integrated structure includes a structure node with an integrated data definition, of the integrated ontology of data definitions, indicating a non-binary correlation between a first data definition for the first ontology of data definitions and a second data definition for the second ontology of data definitions In some embodiments, machine learning model 402 may include an artificial neural network. In such embodiments, machine learning model 402 may include input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 402 may corresponds to a classification of machine learning model 402 and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free flowing, with connections interacting in a more chaotic and complex fashion. During testing, an output layer of machine learning model 402 may indicate whether or not a given input corresponds to a classification of machine learning model 402 (e.g., determine whether two data definitions are correlated).

System 400 also includes API layer 450. In some embodiments, API layer 450 may be implemented on user device 422 or user device 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use developer portal. API layer 450 may use strong security constraints applying WAF and DDoS protection, and API layer 450 may use RESTful APIs as standard for external integration.

Figure 5:
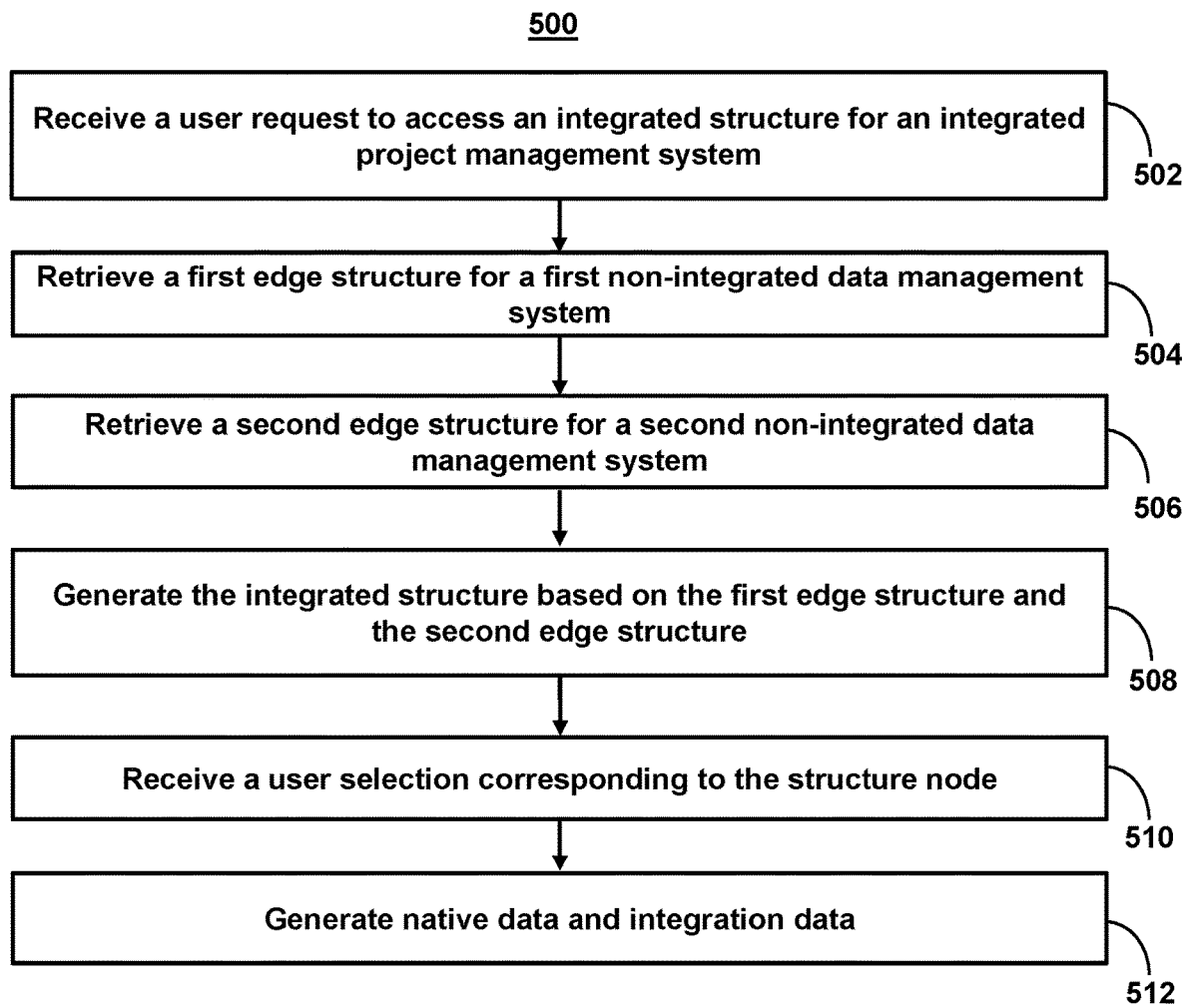
FIG. 5 shows flowchart of the steps involved in generating native data and relationship data in an integrated data management system.

FIG. 5 shows flowchart of the steps involved in generating native data and relationship data in an integrated data management system. For example, process 500 may represent the steps taken by one or more devices as shown in FIG. 4 when integrating disparate data domains over computer networks. In some embodiments, process 500 may be combined with one or more steps of process 600 (FIG. 6)). For example, process 500 may relate to an integrated data management system that may store native data corresponding to fields of a first non-integrated data management systems (or other non-integrated systems) and relationship data (e.g., viewable through a user interface (e.g., user interface 100 (FIG. 1)). The relationship data may describe a relationship of the native data to the integrated data management system, at a structure node in the architecture of the integrated data management system. The structure node may correspond to the convergence of two structures in the architecture of the integrated data management system (e.g., identify to employment opportunities that are related). Each structure may itself correspond to a native hierarchal relationship in a non-integrated data management system.

At step 502, process 500 receives (e.g., using control circuitry of one or more components of system 400 (FIG. 4)) a user request to access an integrated structure for an integrated data management system. For example, the system may receive (e.g., via a user interface 100 (FIG. 1)) a user request to access an integrated structure for an integrated data management system, wherein the integrated structure is defined by an integrated ontology of data definitions for the integrated data management system. For example, the system may receive a user query to view information about the progress of a data definition in data related to the integrated data management system. For example, the system may receive a user query for the integrated data management system, determine that a response to the user query is based on a data definition in a first ontology, retrieve native description data for the data definition, and generate for display the response based on the native description data.

At step 504, process 500 retrieves (e.g., using control circuitry of one or more components of system 400 (FIG. 4)) a first edge structure for a first non-integrated data management system. For example, the system may retrieve, a first edge structure for a first non-integrated data management system, wherein the first edge structure is defined by a first ontology of data definitions for the first non-integrated data management system. In some embodiments, the first data structure may comprise a data organization, management, and storage format that enables efficient access and modification for the first non-integrated data management system. For example, the first data structure may include a collection of data values, data fields, the relationships among them, and the functions or operations that can be applied to the data.

At step 506, process 500 retrieves (e.g., using control circuitry of one or more components of system 400 (FIG. 4)) a second edge structure for a second non-integrated data management system. For example, the system may retrieve a second edge structure for a second non-integrated data management system, wherein the second edge structure is defined by a second ontology of data definitions or the second non-integrated data management system. In some embodiments, the second data structure may comprise a data organization, management, and storage format that enables efficient access and modification for the second non-integrated data management system. For example, the second data structure may include a collection of data values, data fields, the relationships among them, and the functions or operations that can be applied to the data.

At step 508, process 500 generates (e.g., using control circuitry of one or more components of system 400 (FIG. 4)) the integrated structure based on the first edge structure and the second edge structure. For example, the system may generate the integrated structure based on the first edge structure and the second edge structure, wherein the integrated structure includes a structure node with an integrated data definition, of the integrated ontology of data definitions, indicating a non-binary correlation between a first data definition for the first ontology of data definitions and a second data definition for the second ontology of data definitions. In some embodiments, generating the integrated structure based on the first edge structure and the second edge structure may comprise retrieving a cognizance graph for the integrated structure. For example, the cognizance graph may indicate a location of the structure node in the integrated structure.

At step 510, process 500 receives (e.g., using control circuitry of one or more components of system 400 (FIG. 4)) a user selection corresponding to the structure node. For example, the system may receive (e.g., via user interface 200 (FIG. 1)), a user selection corresponding to the structure node. For example, the structure node may be a basic unit of a data structure, such as a linked between one or more structures. Each structure node may contain data and also may link to other nodes. For example, the integrated structure may be represented by a non-linear data structure of nodes and edges. In some embodiments, the system may implement links between nodes through pointers.

At step 512, process 500 generates (e.g., using control circuitry of one or more components of system 400 (FIG. 4)) generate native data and relationship data. For example, the system may generate for display (e.g., on user interface 100 (FIG. 1)), native data, based on the non-binary correlation, for the first edge structure or the second edge structure, and relationship data, wherein the relationship data describes, in a human-readable format, a relationship of the native data to the integrated ontology of data definitions.

For example, native data may comprise native data or native data-formats comprise data that originates from and/or relates to the first non-integrated data management system, the second non-integrated data management systems, a respective plugin designed therefor. In some embodiments, native data may include data resulting from native code, which is code written specifically for the first non-integrated data management system, the second non-integrated data management systems, and/or a respective plugin designed therefor.

For example, the relationship data may be presented in any format and/or representation of data that can be naturally read by humans (e.g., via a user interface such as user interface 100 (FIG. 1)). In some embodiments, the relationship data may appear as a graphical representation of data. In some embodiments, the relationship of the native data to the integrated structure may comprise a graphical display describing a hierarchal relationship of the first ontology of data definitions and the second ontology of data definitions.

In some embodiments, the system may allow a user to update and/or edit the relationship data. For example, the system may receive a user edit to the relationship data and then store the edited relationship data. The system may then generate for display the edited relationship data subsequently. For example, the system may allow users have a given authorization to edit relationship data subject to that authorization. In such cases, the relationship data may have read/write privileges. Upon generating the relationship data for display, the system may verify that a current user has one or more read/write privileges. Upon verifying the level of privileges, the system may grant the user access to edit the relationship data.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 5.

Figure 6:
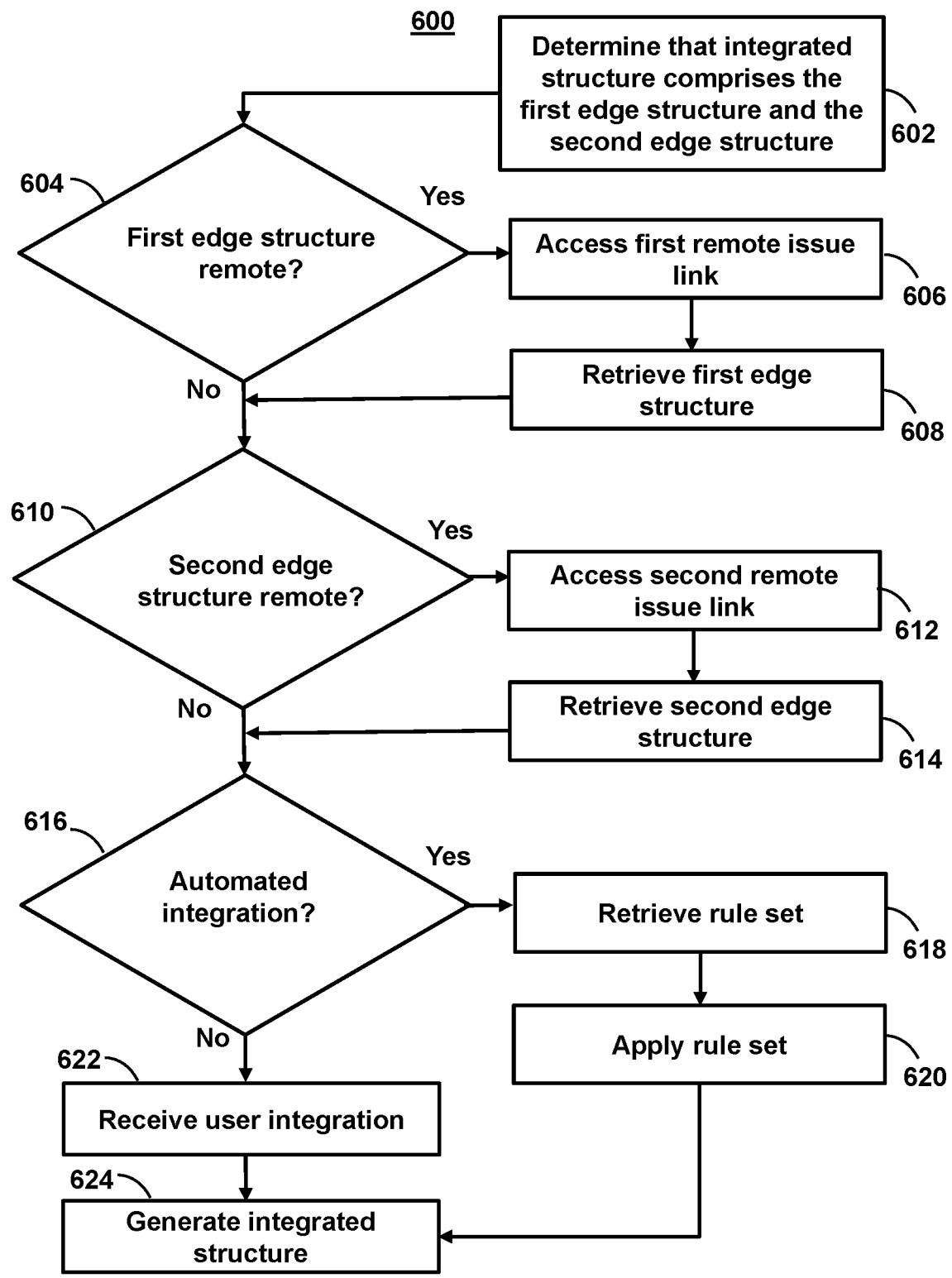
FIG. 6 shows a flowchart of the steps involved in generating an integrated structure in an integrated data management system, in accordance with one or more embodiments.

FIG. 6 shows a flowchart of the steps involved in generating an integrated structure in an integrated data management system, in accordance with one or more embodiments. For example, process 600 may represent the steps taken by one or more devices as shown in FIGS. 1-4. In some embodiments, process 600 may be combined with one or more steps of process 500 (FIG. 5)).

At step 602, process 600 determines (e.g., using control circuitry of one or more components of system 400 (FIG. 4)) that the integrated structure comprises the first edge structure and the second edge structure. For example, in response to a user query (e.g., via user interface 100 (FIG. 1)) to access an integrated structure for an integrated data management system, the system may determine the one or more structures (or one or more second non-integrated data management systems related to the structures), the system may input the user query into a database listing available structures (and/or second non-integrated data management systems related to the structures). The system may filter the available structures to determine one or more structures that comprised by the integrated structure.

At step 604, process 600 determines (e.g., using control circuitry of one or more components of system 400 (FIG. 4)) whether or not the first edge structure is located remotely. For example, if the data source contains multiple data management servers, native plugins may be limited to detecting data related to one or more servers. In some embodiments, the system may read in and build a merged ontology (e.g., a cross-server ontology) from remote issue links. If process 600 determines that the first edge structure is located remotely, process 600 proceeds to step 606. If process 600 determines that the first edge structure is not located remotely, process 600 proceeds to step 610.

At step 606, process 600 accesses (e.g., using control circuitry of one or more components of system 400 (FIG. 4)) a first remote issue link. For example, the first remote issue link may be an identifier that uniquely identifies a remote application and/or a remote object within a remote system housing the first edge structure.

At step 608, process 600 retrieves (e.g., using control circuitry of one or more components of system 400 (FIG. 4)) the first edge structure. For example, in response to receiving the user request to access the integrated structure, the system may determine that the integrated structure comprises the first edge structure. In response to determining that the integrated structure comprises the first edge structure, the system may access the first remote issue link to a first server housing the first edge structure. Through the first remote issue link, the system may retrieve (e.g., download, stream, and/or otherwise access through one or more API or database functions) the first edge structure.

At step 610, process 600 determines (e.g., using control circuitry of one or more components of system 400 (FIG. 4)) whether or not the second edge structure is located remotely. For example, similar to the first edge structure, the system may determine if the second edge structure is available locally or remotely. If process 600 determines that the first edge structure is located remotely, process 600 proceeds to step 612. If process 600 determines that the first edge structure is not located remotely, process 600 proceeds to step 616.

At step 612, process 600 accesses (e.g., using control circuitry of one or more components of system 400 (FIG. 4)) a second remote issue link. For example, the second remote issue link may be an identifier that uniquely identifies a second remote application and/or a second remote object within a second remote system housing the second edge structure. It should be noted that in some embodiments, the first and second edge structures may be located in the same remote server. Furthermore, in some embodiments, the remote server may be a component of system 400 (FIG. 4)).

At step 614, process 600 retrieves (e.g., using control circuitry of one or more components of system 400 (FIG. 4)) the second edge structure. For example, in response to receiving the user request to access the integrated structure, the system may determine that the integrated structure comprises the second edge structure. In response to determining that the integrated structure comprises the second edge structure, the system may access the second remote issue link to a second server housing the second edge structure. Through the second remote issue link, the system may retrieve (e.g., download, stream, and/or otherwise access through one or more API or database functions) the second edge structure.

At step 616, process 600 determines (e.g., using control circuitry of one or more components of system 400 (FIG. 4)) whether or not the first and second edge structure are automatically integrated to generate the integrated structure.

For example, in some embodiments, structure automation may be used to reduce manual effort maintaining the integrated structure. In such cases, the system may retrieve rules supported by a data management system (or structure plugins). Exemplary rules may include "Add data definition belonging to first domain" (e.g., which may pull in employment characteristics for a first employer) and "Add sub-data definitions" (e.g., which may pull in all sub-employment characteristics belonging to each employment characteristic). If process 600 determines if the first and second edge structure are automatically integrated to generate the integrated structure, process 600 proceeds to step 618. If process 600 determines that the first and second edge structures are not automatically integrated to generate the integrated structure, process 600 proceeds to step 622.

At step 618, process 600 retrieves (e.g., using control circuitry of one or more components of system 400 (FIG. 4)) a rule set. In some embodiments, the system may retrieve a standard rule set. Alternatively, the system may retrieve a custom rule set. For example, the system may select a rule set from a plurality of available rules sets based on a type of one or more structures. For example, the system may determine a first system type for the first non-integrated data management system. The system may then determine a second system type for the second non-integrated data management system. The system may then determine a rule set for automatically generating the integrated structure based on the first system type and the second system type.

At step 620, process 600 applies (e.g., using control circuitry of one or more components of system 400 (FIG. 4)) a rule set. For example, the system may automatically generate the integrated structure based on the applying the rule set selected in step 618.

At step 622, process 600 receives (e.g., using control circuitry of one or more components of system 400 (FIG. 4)) user integration. For example, the system may receive user inputs (e.g., via user interface 100 (FIG. 1)) selecting structure nodes that are shared by the first and second edge structure. Alternatively or additionally, the system may receive user inputs selecting a rule set for integrating one or more structures and/or one or more portions of a structure.

At step 624, process 600 generates (e.g., using control circuitry of one or more components of system 400 (FIG. 4)) an integrated structure. For example, the system may generate for display the integrated structure in a user interface (e.g., user interface 300 (FIG. 3)). In some embodiments, generating the integrated structure may be an iterative process. For example, the system may generate a cognizance graph for the integrated structure. The system may then determine structure nodes (e.g., between the first and second edge structure) based on the rule set selected in step 618 or based on the manual integration performed by a user in step 622.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time, near real time, or periodically. It should also be noted that the systems and/or methods described above may be applied to, or used in accordance with, other systems and/or methods.

The present techniques will be better understood with reference to the following enumerated embodiments:

1. A method of monitoring contributor performance in software development version control systems, the method comprising: receiving a user request to access an integrated structure for an integrated data management system, wherein the integrated structure is defined by an integrated ontology of data definitions for the integrated data management system; retrieving a first edge structure for a first non-integrated data management system, wherein the first edge structure is defined by a first ontology of data definitions for the first non-integrated data management system; retrieving a second edge structure for a second non-integrated data management system, wherein the second edge structure is defined by a second ontology of data definitions a for the second non-integrated data management system; generating the integrated structure based on the first edge structure and the second edge structure, wherein the integrated structure includes a structure node with an integrated data definition, of the integrated ontology of data definitions, indicating a non-binary correlation between a first data definition for the first ontology of data definitions and a second data definition for the second ontology of data definitions; receiving a user selection corresponding to the structure node; and in response to the user selection corresponding to the structure node, generating for display native data, based on the non-binary correlation, for the first edge structure or the second edge structure, and relationship data, wherein the relationship data describes, in a human-readable format, a relationship of the native data to the integrated ontology of data definitions.
2. The method of embodiment 1, wherein the native data describes a record based on the first ontology of data definitions or the second ontology of data definitions.
4. The method of embodiment 1 or 2, wherein the native data describes a source of the first ontology of data definitions or the second ontology of data definitions.
5. The method of any one of embodiments 1-4, wherein the relationship of the native data to the integrated structure comprises a graphical display describing a hierarchal relationship of the first ontology of data definitions and the second ontology of data definitions.
6. The method of any one of embodiments 1-5, wherein generating the integrated structure based on the first edge structure and the second edge structure comprises retrieving a cognizance graph for the integrated structure, and wherein the cognizance graph indicates a location of the structure node in the integrated structure.
7. The method of any one of embodiments 1-6, further comprising: in response to receiving the user request to access the integrated structure, determining that the integrated structure comprises the first edge structure and the second edge structure; and in response to determining that the integrated structure comprises the first edge structure and the second edge structure, accessing: a first remote issue link to a first server housing the first edge structure; and a second remote issue link to a second server housing the first edge structure.
8. The method of any one of embodiments 1-7, further comprising: determining a first system type for the first non-integrated data management system; determining a second system type for the second non-integrated data management system; and determining a rule set for automatically generating the integrated structure based on the first system type and the second system type.
9. The method of any one of embodiments 1-8, further comprising: receiving a user query for the integrated data management system; determining that a response to the user query is based on a data definition in the first ontology; retrieving native description data for the data definition; and generating for display the response based on the native description data.
10. The method of any one of embodiments 1-9, wherein the integrated structure comprises a cognizance graph featuring a plurality of structure nodes for the integrated structure.
11. The method of any one of embodiments 1-10, further comprising: receiving a user edit to the relationship data; and storing the edited relationship data.
12. A tangible, non-transitory, machine-readable medium storing instructions that, when executed by a data processing apparatus, cause the data processing apparatus to perform operations comprising those of any of embodiments 1-11.
13. A system comprising: one or more processors; and memory storing instructions that, when executed by the processors, cause the processors to effectuate operations comprising those of any of embodiments 1-11.
14. A system comprising means for performing any of embodiments 1-11.
15. A system comprising cloud-based circuitry for performing any of embodiments 1-11.

We claim:

1. A method for integrating disparate data domains over computer networks, comprising:
receiving, via a user interface, a user request to access an integrated structure for an integrated data management system, wherein the integrated structure is defined by an integrated ontology of data definitions for the integrated data management system;
retrieving, using control circuitry, a first edge structure for a first non-integrated data management system, wherein the first edge structure is defined by a first ontology of data definitions for the first non-integrated data management system;
retrieving, using the control circuitry, a second edge structure for a second non-integrated data management system, wherein the second edge structure is defined by a second ontology of data definitions for the second non-integrated data management system;
determining a first system type for the first non-integrated data management system;
determining a second system type for the second non-integrated data management system;
determining a rule set for automatically generating the integrated structure based on a strength of correlation between the first system type and the second system type;
generating, using the control circuitry, the integrated structure based on the first edge structure and the second edge structure, wherein the integrated structure includes a structure node with an integrated data definition, of the integrated ontology of data definitions, indicating a non-binary correlation between a first data definition for the first ontology of data definitions and a second data definition for the second ontology of data definitions, wherein the non-binary correlation comprises a collection of results keyed to the second data definition that includes the first data definition, wherein each result of the collection of results comprises a respective floating point value for a pair between the second data definition and a respective data definition, and wherein the respective floating point value indicates a degree of fit for the pair;
receiving, via the user interface, a user selection corresponding to the structure node; and
in response to the user selection corresponding to the structure node, generating for display, on the user interface, native data, based on the non-binary correlation, for the first edge structure or the second edge structure, and relationship data, wherein the relationship data describes, in a human-readable format, a relationship of the native data to the integrated ontology of data definitions.

2. The method of claim 1, wherein the native data describes a record based on the first ontology of data definitions or the second ontology of data definitions.

3. The method of claim 1, wherein the native data describes a source of the first ontology of data definitions or the second ontology of data definitions.

4. The method of claim 1, wherein the relationship of the native data to the integrated structure comprises a graphical display describing a hierarchal relationship of the first ontology of data definitions and the second ontology of data definitions.

5. The method of claim 1, wherein generating the integrated structure based on the first edge structure and the second edge structure comprises retrieving a cognizance graph for the integrated structure, and wherein the cognizance graph indicates a location of the structure node in the integrated structure.

6. The method of claim 1, further comprising:
in response to receiving the user request to access the integrated structure, determining that the integrated structure comprises the first edge structure and the second edge structure; and
in response to determining that the integrated structure comprises the first edge structure and the second edge structure, accessing:
a first remote issue link to a first server housing the first edge structure; and
a second remote issue link to a second server housing the first edge structure.

7. The method of claim 1, further comprising:
receiving a user query for the integrated data management system;
determining that a response to the user query is based on a data definition in the first ontology;
retrieving native description data for the data definition; and
generating for display the response based on the native description data.

8. The method of claim 1, wherein the integrated structure comprises a cognizance graph featuring a plurality of structure nodes for the integrated structure.

9. The method of claim 1, further comprising:
receiving a user edit to the relationship data; and
storing the edited relationship data.

10. A non-transitory, computer-readable medium for integrating disparate data domains over computer networks, comprising instructions that, when executed by one or more processors, cause operations comprising:
receiving, via a user interface, a user request to access an integrated structure for an integrated data management system, wherein the integrated structure is defined by an integrated ontology of data definitions for the integrated data management system;
retrieving, using control circuitry, a first edge structure for a first non-integrated data management system, wherein the first edge structure is defined by a first ontology of data definitions for the first non-integrated data management system;
retrieving, using the control circuitry, a second edge structure for a second non-integrated data management system, wherein the second edge structure is defined by a second ontology of data definitions for the second non-integrated data management system;
determining a first system type for the first non-integrated data management system;
determining a second system type for the second non-integrated data management system;
determining a rule set for automatically generating the integrated structure based on a strength of correlation between the first system type and the second system type;
generating, using the control circuitry, the integrated structure based on the first edge structure and the second edge structure, wherein the integrated structure includes a structure node with an integrated data definition, of the integrated ontology of data definitions, indicating a non-binary correlation between a first data definition for the first ontology of data definitions and a second data definition for the second ontology of data definitions, and wherein the non-binary correlation comprises a collection of results keyed to the second data definition that includes the first data definition, wherein each result of the collection of results comprises a respective floating point value for a pair between the second data definition and a respective data definition, and wherein the respective floating point value indicates a degree of fit for the pair;
receiving, via the user interface, a user selection corresponding to the structure node; and
in response to the user selection corresponding to the structure node, generating for display, on the user interface, native data, based on the non-binary correlation, for the first edge structure or the second edge structure, and relationship data, wherein the relationship data describes, in a human-readable format, a relationship of the native data to the integrated ontology of data definitions.

11. The non-transitory, computer-readable medium of claim 10, wherein the native data describes a record based on the first ontology of data definitions or the second ontology of data definitions.

12. The non-transitory, computer-readable medium of claim 10, wherein the native data describes a source of the first ontology of data definitions or the second ontology of data definitions.

13. The non-transitory, computer-readable medium of claim 10, wherein the relationship of the native data to the integrated structure comprises a graphical display describing a hierarchal relationship of the first ontology of data definitions and the second ontology of data definitions.

14. The non-transitory, computer-readable medium of claim 10, wherein generating the integrated structure based on the first edge structure and the second edge structure comprises retrieving a cognizance graph for the integrated structure, and wherein the cognizance graph indicates a location of the structure node in the integrated structure.

15. The non-transitory, computer-readable medium of claim 10, wherein the instructions cause further operations comprising:
in response to receiving the user request to access the integrated structure, determining that the integrated structure comprises the first edge structure and the second edge structure; and
in response to determining that the integrated structure comprises the first edge structure and the second edge structure, accessing:
a first remote issue link to a first server housing the first edge structure; and
a second remote issue link to a second server housing the first edge structure.

16. The non-transitory, computer-readable medium of claim 10, wherein the instructions cause further operations comprising:
determining a first system type for the first non-integrated data management system;
determining a second system type for the second non-integrated data management system; and
determining a rule set for automatically generating the integrated structure based on a strength of correlation between the first system type and the second system type.

17. The non-transitory, computer-readable medium of claim 10, wherein the instructions cause further operations comprising:
receiving a user query for the integrated data management system;
determining that a response to the user query is based on a data definition in the first ontology;
retrieving native description data for the data definition; and
generating for display the response based on the native description data.

18. The non-transitory, computer-readable medium of claim 10, wherein the integrated structure comprises a cognizance graph featuring a plurality of structure nodes for the integrated structure.

* * * * *